United States Patent
Huh et al.

(10) Patent No.: US 11,686,583 B2
(45) Date of Patent: Jun. 27, 2023

(54) GUIDANCE ROBOT AND METHOD FOR NAVIGATION SERVICE USING THE SAME

(71) Applicant: LG ELECTRONICS INC., Seoul (KR)

(72) Inventors: Ji Young Huh, Yongin (KR); Ji Hye Kim, Seoul (KR); Jin Sung Park, Hwaseong (KR); Moon Sub Jin, Yongin (KR); Beom Oh Kim, Suwon (KR)

(73) Assignee: LG ELECTRONICS INC., Seoul (KR)

( * ) Notice: Subject to any disclaimer, the term of this patent is extended or adjusted under 35 U.S.C. 154(b) by 537 days.

(21) Appl. No.: 16/590,269

(22) Filed: Oct. 1, 2019

(65) Prior Publication Data

US 2020/0033135 A1    Jan. 30, 2020

(30) Foreign Application Priority Data

Aug. 22, 2019    (KR) .......................... 10-2019-0102887

(51) Int. Cl.
*G01C 21/20* (2006.01)
*B25J 11/00* (2006.01)
*G06V 40/16* (2022.01)

(52) U.S. Cl.
CPC .......... *G01C 21/206* (2013.01); *B25J 11/0005* (2013.01); *G06V 40/166* (2022.01); *G06V 40/172* (2022.01)

(58) Field of Classification Search
CPC ........ B25J 11/0005; B25J 9/1697; B25J 9/16; B25J 9/1664; B25J 9/1679; B25J 19/02; B25J 11/008; B25J 9/1666
See application file for complete search history.

(56) References Cited

U.S. PATENT DOCUMENTS

| | | | |
|---|---|---|---|
| 2015/0141136 A1* | 5/2015 | Ahuja | A63F 13/67 463/29 |
| 2016/0114488 A1* | 4/2016 | Mascorro Medina | B25J 9/1697 901/1 |
| 2017/0344106 A1* | 11/2017 | Cohen | G06F 3/013 |
| 2018/0364045 A1* | 12/2018 | Williams | G01S 17/88 |
| 2019/0354246 A1* | 11/2019 | Park | G06F 1/3265 |

(Continued)

FOREIGN PATENT DOCUMENTS

| | | | | |
|---|---|---|---|---|
| EP | 3527336 A1 * | 8/2019 | | B25J 11/0005 |
| KR | 1020160000162 | 1/2016 | | |

(Continued)

*Primary Examiner* — Redhwan K Mawari (74) *Attorney, Agent, or Firm* — Lee Hong Degerman Kang & Waimey (57) ABSTRACT

The present disclosure relates to a facility guide robot that provides necessary information to a user who uses the facility while moving inside the facility. Specifically, the present disclosure relates to a facility guide robot and a facility guide method using the same, wherein the facility guide robot may actively provide the guide information to the facility users before the facility user requests to use the facility guide robot. That is, the convenience of the facility user may be improved by allowing the facility guide robot to provide the guide information necessary to the facility user before the facility user, who needs the guide, checks or calls the facility guide robot to receive the guide information.

10 Claims, 8 Drawing Sheets

(56) References Cited

U.S. PATENT DOCUMENTS

| | | | |
|---|---|---|---|
| 2019/0392822 A1* | 12/2019 | Takahashi | G06F 3/167 |
| 2020/0047346 A1* | 2/2020 | Yang | B25J 11/008 |
| 2020/0088524 A1* | 3/2020 | Shin | G06V 20/10 |
| 2020/0098188 A1* | 3/2020 | Bar-Zeev | G06T 19/006 |
| 2020/0364904 A1* | 11/2020 | Najaf-Zadeh | G06T 9/00 |

FOREIGN PATENT DOCUMENTS

| | | | |
|---|---|---|---|
| KR | 1020180039438 | 4/2018 | |
| WO | WO-2018052204 A1 * | 3/2018 | B25J 11/008 |
| WO | WO-2018070663 A1 * | 4/2018 | B25J 11/00 |
| WO | WO-2018070686 A1 * | 4/2018 | B25J 11/00 |
| WO | WO-2018070687 A1 * | 4/2018 | B25J 11/0005 |
| WO | WO-2018117513 A1 * | 6/2018 | B25J 11/00 |
| WO | WO-2018128292 A1 * | 7/2018 | B25J 11/0005 |

* cited by examiner

GUIDANCE ROBOT AND METHOD FOR NAVIGATION SERVICE USING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0102887, filed on Aug. 22, 2019, the contents of which are hereby incorporated by reference herein in its entirety.

BACKGROUND

1. Technical Field

The present disclosure relates to a facility guide robot for providing necessary information to a user who uses the facility while moving inside the facility, and a facility guide method using the same. More specifically, the present disclosure relates to a technology in which the facility guide robot actively provide guide information to the facility user before the facility user requests the facility guide robot for the guide information.

2. Description of Related Art

The following description is only for the purpose of providing background information related to embodiments of the present disclosure, and the contents to be described do not necessarily constitute related art.

Robots have been developed for industrial use and were partially responsible for factory automation. In recent years, the field of applications for robots has been further expanded to, for example, medical robots and aerospace robots. In addition, household robots that may be used in ordinary homes are being developed. Among these robots, a robot capable of autonomously moving is called a mobile robot.

In particular, as the autonomous driving technology, the automatic control technology, the Internet of Things, and the like are developed using deep learning technology, the role of the robot is expanding. The robot may drive itself in homes, offices, facilities and the like and perform specific tasks.

Specifically, inside a large facility such as an airport, a cleaning robot configured to clean the inside of the facility, a guide robot configured to provide the guide information to users in the facility while moving inside the facility and the like are disposed.

In the case of the guide robot that provides the guide information to facility users, the user often uses the guide robot only when the user needs the guide information on the facility. Therefore, the guide robot has a limitation in actively providing the guide information to the facility users who need the guide information.

Preferably, the guide robot should efficiently provide the guide information to the facility users in the facility. According to the related technology, Korean Patent Application Publication No. 10-2018-0039438 (hereinafter referred to as "Related Art 1"), entitled 'GUIDANCE ROBOT FOR AIRPORT AND METHOD THEREOF' discloses a guide robot for airport disposed at an airport that provides a road guide service while accompanying a user to a destination and displaying the front view.

Although the related art 1 discloses a technology in which the robot provides a road guide service to an actual destination when an airport user requests the robot for the road guide service, the related art 1 does not disclose a technology in which the guide robot actively provides a facility guide service to a facility user requiring facility guide service.

In addition, Korean Patent Publication No. 10-2016-0000162 (hereinafter referred to as "Related Art 2"), entitled 'SELF MOVING METHOD OF SERVICE ROBOT' discloses a technology capable of preventing collision between the service robot and obstacles when the service robot autonomously travels.

However, the related art 2 does not disclose a technology in which the service robot actively provides the facility guide service to the facility user requiring facility guide service.

Therefore, there is a need for a technology capable of actively outputting and providing appropriate guide information to the facility user who requires the guide information before the facility user requests the guide robot for the necessary information.

The above-described background technology is technical information that the inventors hold for the derivation of the present disclosure or that the inventors acquired in the process of deriving the present disclosure. Thus, the above-described background technology cannot be regarded as known technology disclosed to the general public prior to the filing of the present application.

RELATED ART DOCUMENT

Related Art 1: Korean Patent Application Publication No. 10-2018-0039438 (published on Apr. 18, 2018)
Related Art 2: Korean Patent Application Publication No. 10-2016-0000162 (published on Jan. 4, 2016)

SUMMARY OF THE INVENTION

The present disclosure is directed to actively providing guide information to a facility user before the facility user requests the guide information.

In addition, the present disclosure is further directed to providing the guide information to a first user who preferentially needs the guide information for using the facility.

In addition, the present disclosure is still further directed to effectively providing the guide information to the user using a facility having a complex geographic condition.

The objective of the present disclosure is not limited to the above-mentioned objectives and other objectives and aspects of the present disclosure which are not mentioned can be understood by the following description, and will be more clearly understood by the embodiments of the present disclosure. It is also to be understood that the aspects of the present disclosure may be realized by means and combinations thereof set forth in claims.

A facility guide robot and a facility guide method using the same according to one embodiment of the present disclosure relates to a technology in which the facility guide robot actively provides the guide information to the facility user before the facility user requests the facility guide robot for the guide information.

Specifically, the facility guide robot according to one embodiment of the present disclosure may include a robot body, a driver configured to move the robot body, a receiver configured to receive at least one of biometric information of a first user who needs guidance among facility users or status information of the facility, a memory configured to store the guide information to be provided to the first user, corresponding to at least one of the biometric information of the first user or the status information of the facility, and a processor configured to output the guide information in the form of at least one of a voice or an image when it is determined that the first user needs the guide information based on at least one of the stored image information or voice information.

Wherein the processor may control the driver so that the guide information is actively provided to the first user before the first user requests the guide information to be provided.

That is, the convenience of the first user may be improved by causing the facility guide robot to provide the guide information necessary to the first user before the first user, who needs the guidance, checks or calls the facility guide robot to receive the guide information.

In addition, the receiver of the facility guide robot according to an embodiment of the present disclosure may include a facility information receiver configured to receive facility use information generated when the first user uses the facility, a face information receiver configured to receive face information of the first user, a voice receiver configured to receive speech of the first user, and a status sensing receiver configured to sense at least one of action of the first user or status information on the facility.

That is, in order to provide necessary information to the first user who uses the facility, information of the first user may be received under various conditions.

In addition, the facility use information according to an embodiment of the present disclosure includes face information of the facility user. The processor further includes an information matcher configured to determine whether face information of the facility user included in the facility use information matches face information of the first user received by the face information receiver. The processor may be configured to provide guide information to the first user when the face information of the first user included in the facility use information matches the face information of the first user received by the face information receiver.

That is, the guide information may be provided to the first user determined to be guided by matching the image of the facility user inputted for using the facility and the image of the facility user extracted by a camera mounted on the facility guide robot.

In addition, the processor of the facility guide robot according to an embodiment of the present disclosure may analyze, from the face information of the first user received by the face information receiver, at least one of information on pupil movement of the first user, information on head movement of the first user, and information on age group of the first user.

Specifically, the processor of the facility guide robot according to an embodiment of the present disclosure provides the guide information to the first user when the pupil movement of the first user or the head movement of the first user occurs more than a predetermined number of times.

That is, when the pupil movement and/or the head movement of a targeted first user among the facility users occurs more than the predetermined number of times, the targeted first user may be looking for a specific location, looking for a companion, or the like. The facility guide robot may output the related guide information to the first user based on face change information of the facility user. Based on the provided guide information, the first user may use the facility more conveniently.

In addition, the facility use information of the facility guide robot according to an embodiment of the present disclosure may include at least one of the number of facility use by the first user or the facility use history information of the first user.

As such, the information of the facility user received by the facility information receiver may be a data used for selecting the first user to which the guide information is to be provided.

In addition, the guide information of the facility guide robot according to an embodiment of the present disclosure may include at least one of the guidance on a gate location for checking the entry and exit of the first user, the guidance on an available space in the facility, the guidance on dangerous factors in the facility, and the guidance on dangerous situations encountered by the first user.

That is, appropriate guide information may be provided to the first user under various situations.

In addition, the facility guide robot according to an embodiment of the present disclosure may further include a targeter configured to select, from among facility users, a first user who preferentially needs guide information.

That is, by selecting, from among the users who have visited the facility, the first user to be actively provided with the guide information, it is possible to provide appropriate guide information to the first user who needs the guide information before the first user requests the guide information.

The facility guide method according to an embodiment of the present disclosure may include receiving at least one of biometric information of a first user who needs guidance among facility users or status information of the facility, and providing the guide information to the first user in the form of as at least one of a voice and an image when it is determined that the first user needs the guide information pre-stored to be provided to the facility user based on at least one of the biometric information of the first user or the status information on the facility.

Wherein when the guide information is provided, the guide information is actively provided to the first user before the first user requests the guide information.

Accordingly, the convenience of the first user may be improved by causing the facility guide robot to provide the necessary guide information to the first user before the first user, who needs the guidance, checks or calls the facility guide robot to receive the guide information.

In addition, according to the facility guide method of the present disclosure, it is possible to collect facility use information of the first user based on at least one of the obtained biometric information of the first user, or status information on the facility.

That is, in order to provide necessary information to the facility user who uses the facility, the information of the facility user may be received under various conditions.

In addition, receiving information according to the method of the present disclosure includes receiving facility use information generated when the first user uses the facility, receiving face information of the first user, receiving a speech of the first user, and sensing at least one of action of the first user or status information on the facility.

Specifically, the facility use information may include face information of the facility user. It is determined whether the face information of the facility user included in the facility use information matches the face information of the first user received when receiving the face information. If so, the guide information may be provided to the first user.

That is, it is possible to provide appropriate guide information to the first user, who needs guidance, by matching the image of the facility user inputted for using the facility and the image of the facility user extracted by the camera mounted on the facility guide robot.

In addition, when providing the guide information according to the facility guide method of the present disclosure at least one of information on the pupil movement of the first user, information on the head movement of the first user, and information on the age group of the first user may be recognized based on the face information of the first user received when receiving face information.

In particular, the guide information may be provided to the first user when the pupil movement of the first user or the head movement of the first user occurs more than a predetermined number of times.

That is, when the pupil movement and/or the head movement of the targeted first user among the facility users occurs more than the predetermined number of times, the targeted first user may be looking for a specific location, looking for a companion, or the like. The facility guide robot may provide the related guide information to the first user based on the face change information of the facility user. Based on the provided guide information, the first user may use the facility more conveniently.

In addition, when receiving facility use information according to the facility guide method of the present disclosure, at least one of the number of facility use by the first user or the facility use history information of the first user may be received.

As such, the information on the facility user received by the facility information receiver may be data used for selecting the first user to which the guide information is to be provided.

In addition, according to the facility guide method of the present disclosure, it is possible to select, from among facility users, a first user who preferentially needs guide information.

That is, by selecting the first user to be actively provided with the guide information from among the users who have visited the facility before the first user requests the guide information, it is possible to provide appropriate guide information to the facility user who needs the guide information.

Other aspects and features than those described above will become apparent from the following drawings, claims, and detailed description of the present disclosure.

According to the present disclosure, the convenience of the facility user may be improved by causing the facility guide robot to provide the necessary guide information to the facility user before the facility user checks or calls the facility guide robot to receive the guide information.

In addition, according to the present disclosure, it is possible to select the facility user to be actively provided with the guide information before the facility user requests the guide information. That is, it is possible to provide the guide information to the facility user who needs the guide information.

According to the present disclosure, it is possible to provide the facility user with location information on a facility, travel distance to facility user's destination or the like, in complex facilities having a complicated structure such as airports and multi-complex facilities, by using a voice, image or the like. As a result, the convenience of a user who uses the facility having the complicated structure may be improved.

The effects of the present disclosure are not limited to the effects mentioned above, and other effects not mentioned may be clearly understood by those skilled in the art from the following description.

BRIEF DESCRIPTION OF THE DRAWINGS

The foregoing and other aspects, features, and advantages of the invention, as well as the following detailed description of the embodiments, will be better understood when read in conjunction with the accompanying drawings. For the purpose of illustrating the present disclosure, there is shown in the drawings an exemplary embodiment, it being understood, however, that the present disclosure is not intended to be limited to the details shown because various modifications and structural changes may be made therein without departing from the spirit of the present disclosure and within the scope and range of equivalents of the claims. The use of the same reference numerals or symbols in different drawings indicates similar or identical items.

DETAILED DESCRIPTION

A detailed description of the present disclosure will now be given, with reference to the drawings. The present disclosure may be embodied in various different forms and is not limited to the embodiments set forth herein. In the following embodiments, parts that are not directly related to the description will be omitted for clarity of description. However, in implementing a device or a system to which the idea of the present disclosure is applied, such omitted elements shall not be construed as being unnecessary. Further, like reference numerals refer to like elements throughout the disclosure.

It will be understood that, although the terms "first", "second", and the like may be used herein to describe various elements, these elements are not limited by these terms. These terms are only used to distinguish one element from another. In addition, in the following description, the singular forms "a", "an", and "the" include plural referents unless the context clearly dictates otherwise.

In the following description, the terms "include", "comprise", "have", and the like designate the existence of features, steps, elements, and combinations thereof, but should not be understood as precluding the existence or addition of one or more other features, steps, elements, and combinations thereof.

The facility guide robot according to an embodiment of the present disclosure refers to a device that provides guide information to a user who is determined to need the guide information on the facility among users using the facility. Hereinafter, for convenience of description, the facility user who is provided with the facility guide information by the facility guide robot will be described as a first user.

Hereinafter, referring to the drawings, the facility guide robot that may provide the guide information to the first user who preferentially needs the guide information to use a facility in a large facility such as an airport will be described in detail.

Figure 1:
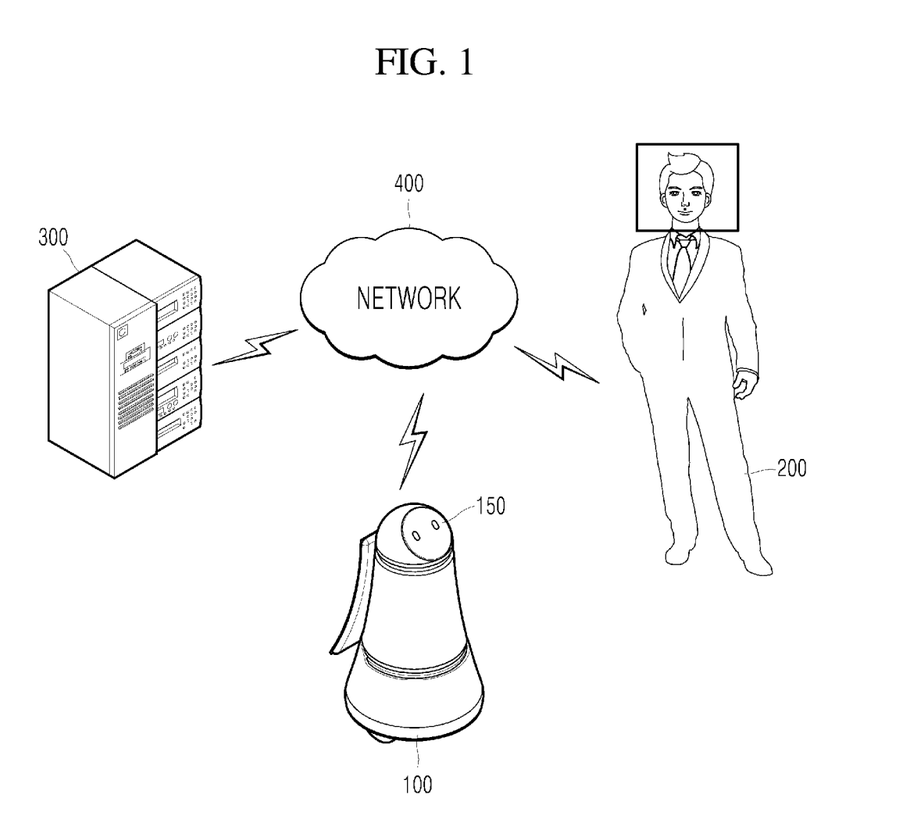
FIG. 1 is an exemplary diagram illustrating an environment in which a facility guide robot is driven, including the facility guide robot, a facility user, a server, and a network connecting them to each other according to an embodiment of the present disclosure.
Figure 2:
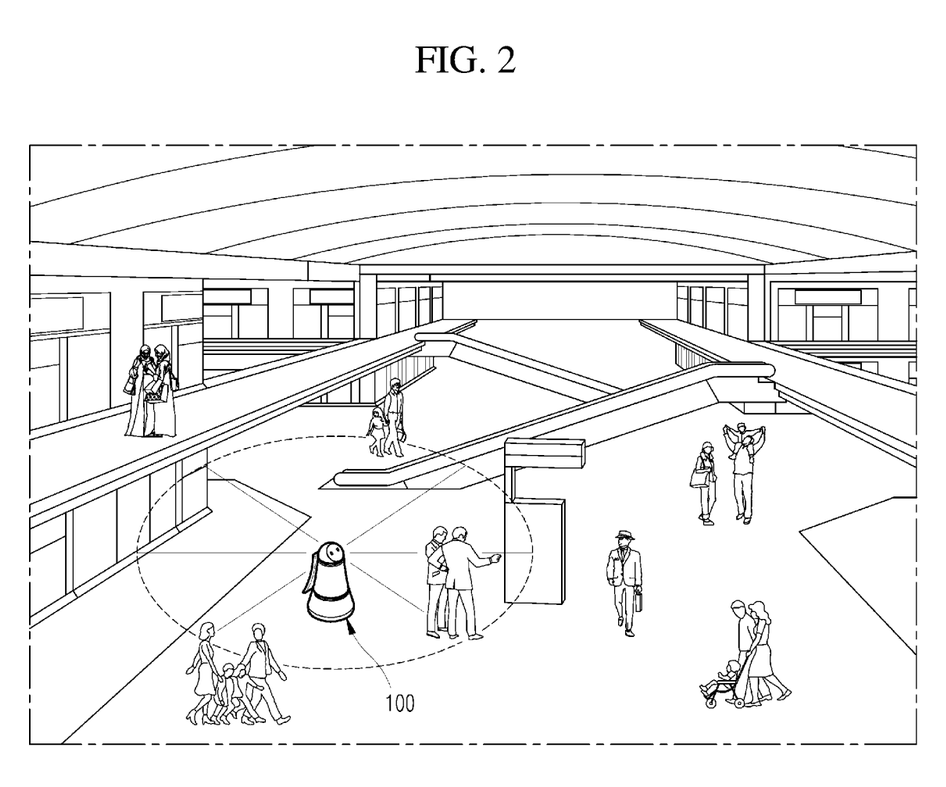
FIG. 2 is a diagram illustrating an example of a facility in which the facility guide robot of FIG. 1 is placed.

FIG. 1 is an exemplary diagram illustrating an environment, in which a facility guide robot is driven, including the facility guide robot, a facility user, a server, and a network connecting them to each other according to an embodiment of the present disclosure, and FIG. 2 is a diagram illustrating an example of a facility in which the facility guide robot of FIG. 1 is placed.

Although the facility guide robot 100 according to an embodiment of the present disclosure is described as being placed in an airport, a train station, a multi-composite facility, or the like to autonomously provide guidance on the use of the facility, the facility guide robot 100 may also provide guidance on the use of the facility in a semi-autonomous or manual mode.

In the following description, an example in which the facility guide robot 100 is placed at the airport to provide airport guide information such as gate information, shop location information, and security checkpoint information to the first user 200 who uses the airport will be described. In addition, an example in which the facility guide robot 100 according to an embodiment of the present disclosure actively approaches the first user 200 to provide the first user 200 with guide information required by the first user 200 before the first user 200 calls the facility guide robot 100 to obtain the guide information will be described.

Referring to FIG. 1, a situation in which the facility guide robot 100, the first user 200, and the server 300 are connected to each other by the network 400 is illustrated. The facility guide robot 100 further includes a communicator (not shown) that enables transmission and reception of data between the facility guide robot 100 and the server 300 via a wired or wireless network 400.

The facility guide robot 100 and the server 300 may be connected to each other in a 5G communication environment. In addition, other than the devices illustrated in FIG. 1, various other electronic devices for use at home or an office may be connected to each other and operate in an Internet-of-Things environment.

The facility guide robot 100 may receive speech spoken by the first user 200 or recognize and analyze information that may be extracted from the image of the first user 200 to provide the first user 200 with appropriate guide information. To this end, the facility guide robot 100 may include an artificial intelligence (AI) speaker and act as a hub controlling an electronic device that does not have voice input/output functionality.

Here, the information extracted from the image of the first user 200 may include face changes and pupil changes of the first user 200 generated when the first user 200 looks around the facility while moving inside the facility. For example, assuming that the first user 200 looks for a specific location in the facility, the first user 200 may perform an action to look for the specific location, such as an action to look around for the specific location. This action of the first user 200 may act as a specific command to cause the facility guide robot 100 to provide the guide information to the first user 200. The criteria for providing the guide information to the first user 200 may be predetermined and stored in the memory 120 to be described later.

In addition, the speech spoken by the first user 200 may act as a specific command for activating a speech recognition function of the facility guide robot 100. For example, the speech spoken by the first user 200 may be a speech for looking for the specific location in the facility. A word, a sentence, and the like corresponding to the speech for looking for the specific location among speeches spoken by the first user 200 may be predetermined and stored in the memory 120 to be described later.

The server 300 may be a database server that provides big data required for applying various artificial intelligence algorithms and data related to the image information of the first user 200. In addition, the server 300 may include a web server or an application server which allows the facility guide robot 100 to be remotely controlled by using an application or web browser installed in the facility guide robot 100.

Here, artificial intelligence (AI) is an area of computer engineering science and information technology that studies methods to make computers mimic intelligent human actions such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed Specifically, the Machine Learning can be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

Both unsupervised learning and supervised learning may be used as a machine learning method of the artificial neural network.

In addition, deep learning, which is a subfield of machine learning, may allow a device or apparatus to perform learning in multiple, progressively deeper stages based on data. Deep learning may represent a set of machine learning algorithms that extract core data from a plurality of data sets as the number of layers in increases.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. The RNN is widely used in natural language processing, and can be effectively used to process time-series data that changes over time, and may construct an ANN structure by progressively extracting higher level features through multiple layers. The DBN may include a deep learning structure that is constructed by stacking the result of restricted Boltzman machine (RBM) learning in multiple layers. When a predetermined number of layers are constructed by repetition of such RBM learning, the DBN provided with the predetermined number of layers can be constructed. CNN includes a model mimicking a human brain function, built on the assumption that when a person recognizes an object, the brain extracts basic features of the object and recognizes the object based on the results of complex processing in the brain.

Meanwhile, learning of an artificial neural network may be performed by adjusting a weight of a connection line (also adjusting a bias value if necessary) between nodes so that a desired output is achieved with regard to a given input. Also, the artificial neural network can continuously update the weight values through learning. Furthermore, methods such as back propagation may be used in training the artificial neural network.

The network 400 may connect the facility guide robot 100 and the server 300. The network 400 may include, for example, wired networks such as local area networks (LANs), wide area networks (WANs), metropolitan area networks (MANs), and integrated service digital networks (ISDNs), or wireless networks such as wireless LANs, CDMA, Bluetooth, and satellite communication, but the scope of the present disclosure is not limited thereto. In addition, the network 400 may transmit and receive information using a short-range communication and/or a long-range communication. Here, the short-range communications may include Bluetooth, radio frequency identification (RFID), infrared data association (IrDA), ultra-wideband (UWB), ZigBee, and wireless fidelity (Wi-Fi) technology. The long-distance communications may include code division multiple access (CDMA), frequency division multiple access (FDMA), time division multiple access (TDMA), orthogonal frequency division multiple access (OFDMA), and single carrier frequency division multiple access (SC-FDMA) technology.

Further, the network 400 may include a connection of network elements such as a hub, a bridge, a router, a switch, and a gateway. The network 400 can include one or more connected networks, for example, a multi-network environment, including a public network such as an Internet and a private network such as a safe corporate private network. Access to the network 400 can be provided via one or more wired or wireless access networks. Furthermore, the network 400 may support the Internet of things (IoT) for 5G communication or exchanging and processing information between distributed elements such as objects.

Figure 3:
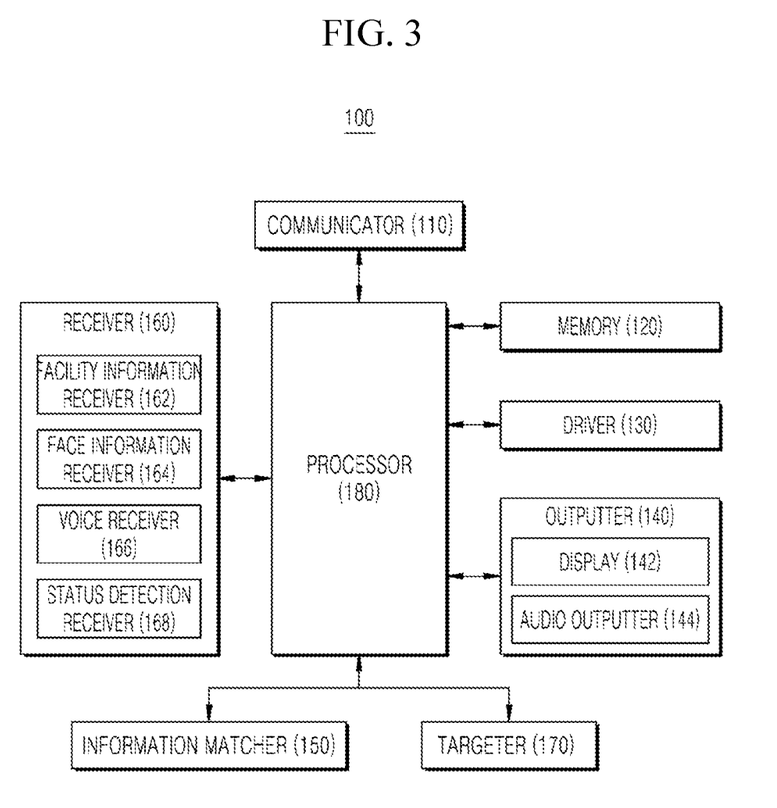
FIG. 3 is a schematic block diagram illustrating a facility guide robot according to an embodiment of the present disclosure.

FIG. 3 is a schematic block diagram illustrating a facility guide robot according to an embodiment of the present disclosure. In the following description, the description of parts that are the same as those in FIG. 1 and FIG. 2 will be omitted.

Referring to FIG. 3, the facility guide robot 100 includes a robot body 112, a communicator 110, a driver 130, a memory 120, a receiver 160, a targeter 170, a processor 180, and the like.

The facility guide robot 100 may include a communicator 110 interworking with the network 400 to provide a communication interface used for providing a transmission/reception signal between the facility guide robot 100 and the server 300 in the form of packet data, such that the facility guide robot 100 may provide the necessary guide information to the first user 200 who needs the guidance among the users who use the facility.

The communicator 110 may receive a predetermined signal for requesting information from an electronic device and/or a terminal carried by the first user 200. In other words, the facility guide robot 100 may receive a predetermined information request signal. The communicator 110 may be a device including hardware and software required to transmit and receive a signal such as a control signal or a data signal via a wired or wireless connection with another network device. Furthermore, the communicator 110 may be a device including hardware and software required for transmitting and receiving signals such as a control signal or data signals via a wired or wireless connection to another network device.

The robot body 112 may form an appearance of the facility guide robot 100 and may include a camera 115 capable of collecting face information of the first user 200 who visits the facility. The camera 115 may extract face information of the first user 200 who visits the facility. The extracted face information may include at least one of a face image, a pupil movement, a head movement of the first user 200, and the like.

In addition, the facility guide robot 100 may include an outputter 140 configured to provide the necessary guide information to the first user 200. For example, when the first user 200 speaks "Where is the gate 36?" or moves his head in various directions to look for a specific gate, the facility guide robot 100 may approach the first user 200 who has spoken or needs guide information to respond with a voice saying "Gate 36 is in the 00 direction" or display an image or a video related to the response on the display 142 mounted on the robot body 112. To this end, the outputter 140 may include a display 142 and an audio outputter 144.

The driver 130 allows the robot body 112 to rotate and move in the facility. To this end, the driver 130 may include at least one driving wheel, a driving motor capable of driving the driving wheel, and the like.

The targeter 170 may select the first user 200 determined to need indoor guide information.

In an embodiment, the user may speak "Where is the gate 36?" In this case, "where" spoken by the user may be a criterion for selecting the first user 200 who needs guidance. Based on the criterion, the targeter 170 may target the user who spoke "where" as the first user 200.

Alternatively, the first user 200 may be targeted based on the facility use information of the user who visits the facility. The facility use information includes, for example, at least one of information on the number of facility use by the user, history information on the use of a space or shop in the facility, and the like. More specifically, assuming that the facility is an airport and the user has visited the airport, it is determined that whether the user needs guidance based on information on the number of visit to the airport by the user, history information on the use of the facility such as the space or shop in the airport, and biometric information of the user, such as face information, and the like. If so, the user may be targeted as the first user 200.

Referring to the process of targeting the first user 200 among the facility users based on the above, the user who visited the facility inputs the facility use history and the biometric information of the user, such as face information, age group, and the like. The inputted information may be stored in the server 300.

The face information of the facility user may be scanned by the camera 115 based on the inputted and stored information of the facility user. While scanning the face information of the facility user, the first visitor, the elderly, those who explicitly ask for help, or the like may be selected as the first user 200 based on previously inputted and stored information of the facility user.

In detail, the first user 200 may be selected based on a specific rule. Here, for example, a specific rule is to target the first user 200 to provide the guide information in the order of those who explicitly ask for help, the first visitor to the facility, and the elderly.

The receiver 160 is configured to receive information on the targeted first user 200.

Specifically, the receiver 160 may include a facility information receiver 162, a face information receiver 164, a voice receiver 166, and a status detection receiver 168.

The facility information receiver 162 may receive facility use information on the first user 200. The facility use information refers to any one of face information of the first user 200, information on the number of the facility use by the first user 200, and facility use history information, such as shop use history information.

The matching of the face information of the first user 200 received by the facility information receiver 162 and the face information of the first user 200 received by the face information receiver 164 to be described later may be a criterion for providing and outputting the facility guide information to the first user 200.

The face information receiver 164 may receive the face information of the first user 200. For example, the face information receiver 164 may receive information on the face image of the first user 200, information on the pupil movement of the first user 200, information on the head movement of the first user 200, and the like.

As described above, it is determined whether the face information of the first user 200 received by the face information receiver 164 matches the face information of the first user 200 received by the facility information receiver 162. To this end, the facility guide robot 100 may further include an information matcher 150 configured to match the face information.

Specifically, facility use information generated when the first user 200 uses the facility may include face information of the first user 200. The information matcher 150 matches the face information of the first user included in the facility use information and the face information of the first user 200 received by the face information receiver 164. When the face information of the first user 200 received by the face information receiver 164 matches the face information of the first user 200 included in the facility use information, the guide information is provided to the first user 200.

In addition, the face information receiver 164 may analyze at least one of information on pupil movement of the first user 200, information on head movement of the first user 200, and information on an age group of the first user 200. That is, the face information receiver 164 analyzes information on the pupil and head movement of the facility user for a predetermined period of time, and when the pupil or head movement of the facility user changes more than a predetermined condition, the facility user may be determined as the first user 200 who needs the guidance. In addition, the face information receiver 164 may analyze age group of the facility user based on the received face information of the facility user, and the first user 200 who needs guidance may be targeted based on the analyzed age group.

The voice receiver may receive speech of the first user 200. That is, the facility guide robot 100 receives the voice of the targeted first user 200, such as "Where is the 36 gate?" at a location adjacent to the targeted first user 200 while moving inside the facility.

The status detection receiver 168 may receive at least one of information on an action of the first user 200 in the facility or status information on the facility. Specifically, when the facility guide robot 100 moves within the facility, the status detection receiver 168 receives an image such as running from among the actions of the first user 200 or an image of a dangerous factor such as cracking of a floor in the facility and slippery floor in the facility, wherein the images are collected by the camera 115.

When the status detection receiver 168 receives the dangerous action of the first user 200 and/or the dangerous factor information in the facility, the facility guide robot 100 moves to the first user 200 to warn him against the dangerous action and/or the dangerous factor within the facility.

As such, when the targeter 170 and the receiver 160 target the first user 200 who needs the guidance, information corresponding to the guidance required by the first user 200 among the guide information stored in the memory 120 is provided to the targeted first user 200.

For example, when the target unit 170 targets the first user 200, the target unit 170 may target the first visitor to the facility as the first user 200 based on the facility use information of the first visitor received by the facility information receiver 162. When the first user 200 is targeted, the guide information necessary for the first user 200 may be determined and selected from among the guide information stored in the memory 120 to be described later. To this end, the facility guide robot 100 may further include an information selector (not shown) configured to select guide information.

The information selector may select a question such as "What can I do for you?" or "Is this your first visit?" Alternatively, when the first user 200 speaks "Where is the gate 20?", the information selector may select the message "Gate 20 is 00 direction" based on the word "gate 20" in the spoken sentence.

In this case, the facility guide robot 100 may move first to the first user 200 before the first user 200 selected by the targeter 170 requests for guide information for using the facility, and ask the first user 200 a question such as "What can I do for you?" or "Is this your first visit?". That is, the facility guide robot 100 may indicate that the facility guide robot 100 can provide guide information to the first user 200 who needs the guidance, and thus, the first user 200 may use the facility more conveniently.

Guide information to be provided to the first user 200, corresponding at least one of biometric information such as face images and speeches of the first user 200, who needs the guide information on facility among facility users and status information on the facility are stored in the memory 120.

For example, guide information on the facility use and biometric information of the targeted first user 200 among facility users visiting the facility, and the like are stored in the memory 120. Voice and/or image for the guide information, required by the first user, based on the facility use guide information, the biometric information of the first user 200, and the like are also stored in the memory 120.

Here, the guide information may include a location of a shop disposed in the facility, a moving distance that the first user 200 should move, and the like provided to the first user 200 using the facility.

In addition, map information within the facility guide information provided to the first user 200 and the like may be pre-stored in the memory 120. The guide information may include location information within the facility, the facility use information, and the like.

Information of the first user 200 stored in the memory 120 may be changed depending on the user selected by the target unit 170. To this end, the memory 120 may further include a decision model generator (not shown) that stores and trains trained machine learning models using a data set labeled with the age group of the first user 200, the number of times the first user 200 has used the facility, and the like when the first user 200 uses the facility. Specifically, a computer-readable program capable of determining whether the information is according to the change of the user who uses the facility may be stored in the memory 120.

The memory 120 described above records and stores information of the first user 200 and may include a volatile or nonvolatile recording medium. The recording medium is for storing data capable of being read by the processor 180 and may include, for example, a hard disk drive (HDD), a solid state drive (SSD), a silicon disk drive (SDD), a ROM, a RAM, a CD-ROM, a magnetic tape, a floppy disk, and an optical data storage device. In this embodiment, the information stored in the memory unit 120 will be described in a context appropriate for each situation.

When the processor 180 determines that the first user 200 needs the guide information based on at least one of the acquired image and voice, the processor 180 may output the guide information stored to be provided to the first user 200 in the form of at least one of a voice or an image.

In this case, the processor 180 may control the driver 130 to actively output the guide information to the first user 200 before the first user 200 requests the output of the guide information.

According to the foregoing example, when the first user 200 speaks "Where is the gate 36?" or when the first user 200 looks around more than the predetermined number of times, the facility guide robot 100 may drive the driver 130 to allow the facility guide robot 100 to be located at a position adjacent to the first user 200.

Here, the processor 180 may include all kinds of devices capable of processing data. The processor' may, for example, refer to a data processing device embedded in hardware, which has physically structured circuitry to perform a function represented by codes or instructions contained in a program. As one example of the data processing device embedded in the hardware, a microprocessor, a central processing unit (CPU), a processor core, a multiprocessor, an application-specific integrated circuit (ASIC), a field programmable gate array (FPGA), and the like may be included, but the scope of the present disclosure is not limited thereto.

Figure 4:
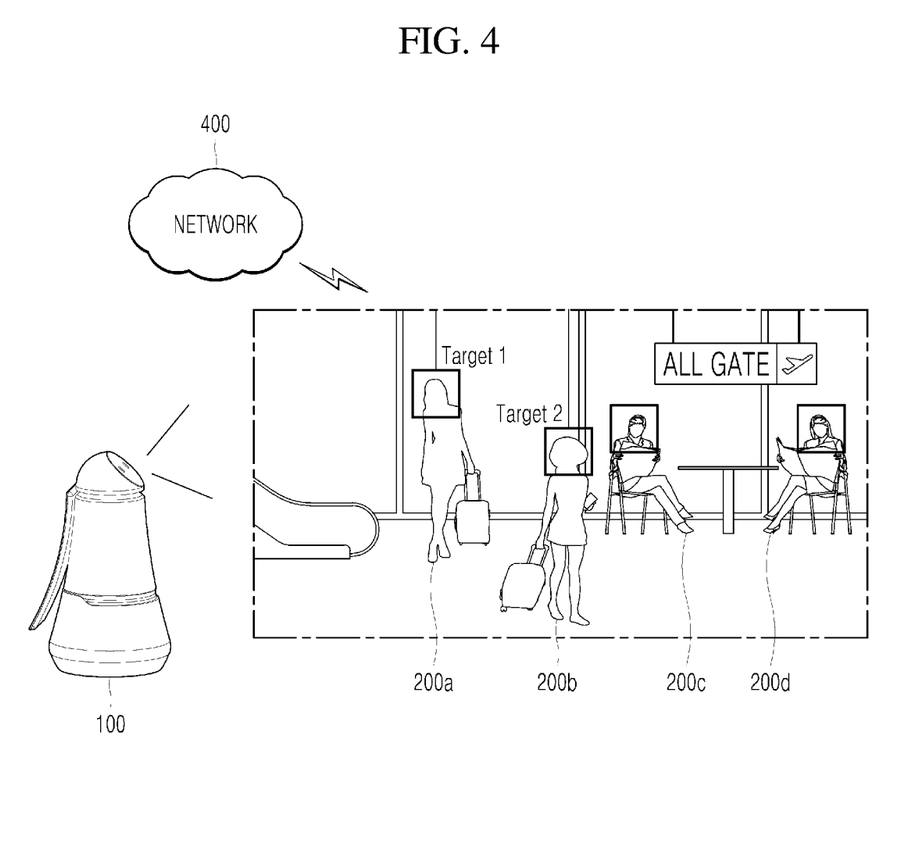
FIG. 4 is a diagram illustrating an example in which a facility guide robot according to an embodiment of the present disclosure selects a target to be provided with the guide information.

FIG. 4 is a diagram illustrating an example in which the facility guide robot according to an embodiment of the present disclosure selects a target to be provided with the guide information. In the following description, the description of parts that are the same as those in FIG. 1 to FIG. 3 will be omitted.

Referring to FIG. 4, the facility guide robot 100 may select, as the first user 200, a user determined to need guidance from among users visiting a facility such as an airport. In this case, the target may be selected based on the facility use information of the user stored in the memory 120 of the facility guide robot 100.

Specifically, when the user 1 200*a* among the facility users 200*a*, 200*b*, 200*c*, and 200*d* explicitly requests the guide information, the facility guide robot 100 may assume that the user 1 200*a* is the preferential target, and move to a location adjacent to the user 1 200*a* to provide the guide information requested by the user 1 200*a*.

Here, an example of explicitly requesting the guide information includes gestures, language, and the like for receiving facility guidance, such as looking around by user 1 200*a*, gestures toward the facility guide robot 100, questions to looking for a specific location in the facility.

Next, when the user 2 200*b* among the facility users 200 visits the facility and the facility use information is stored as being the first visit to the facility by the user 2 200*b*, the user 2 200*b* may be the next target to be provided with the guide information.

As described above, the facility information receiver 162 may receive the number of facility visits by the first user 200, facility use history information of the first user 200, and the like among the facility use information of the first user 200. The facility guide robot 100 moves to the first user 200 selected as a target based on the received information to induce the first user 200 to request facility guide information.

The facility guide robot 100 may move to the target based on the facility use information, and ask the first user 200 a question such as "What can I do for you?" or "Is this your first visit?".

Subsequently, when the first user 200 asks, "Where is the gate 20?", the selection unit 10 may select guide information for providing guidance on the position of the "gate 20".

Alternatively, although the visit to the facility by the user 2 200*b* among the facility user 200 is stored as being not the first time, it may be analyzed whether a change in pupil movement and/or head movement of the user 2 200*b* occurs more than a predetermined number of times. If so, the second user 200*b* may be selected as a target to which the guide information may be provided.

Specifically, when the pupil of the user 2 200*b* is imaged at a predetermined interval and the pupil position of the user 2 200*b* is analyzed to move more than a predetermined number of times during the predetermined interval, it may be determined that the user 2 200*b* is looking for a specific location. Specifically, when the first user 200 wants to look for a specific position, the first user 200 may look around, move the pupil up and down, and the like.

In this case, the facility guide robot 100 may move to the target based on the face change information of the first user 200, and may ask the first user 200 a question such as "What can I do you?"

Subsequently, when the first user 200 asks, "Where is the gate 36?" or "Where is the duty-free shop?", the selector 110 may select guide information for providing guidance on the location of the "gate 36" or the "duty-free shop".

Figure 5:
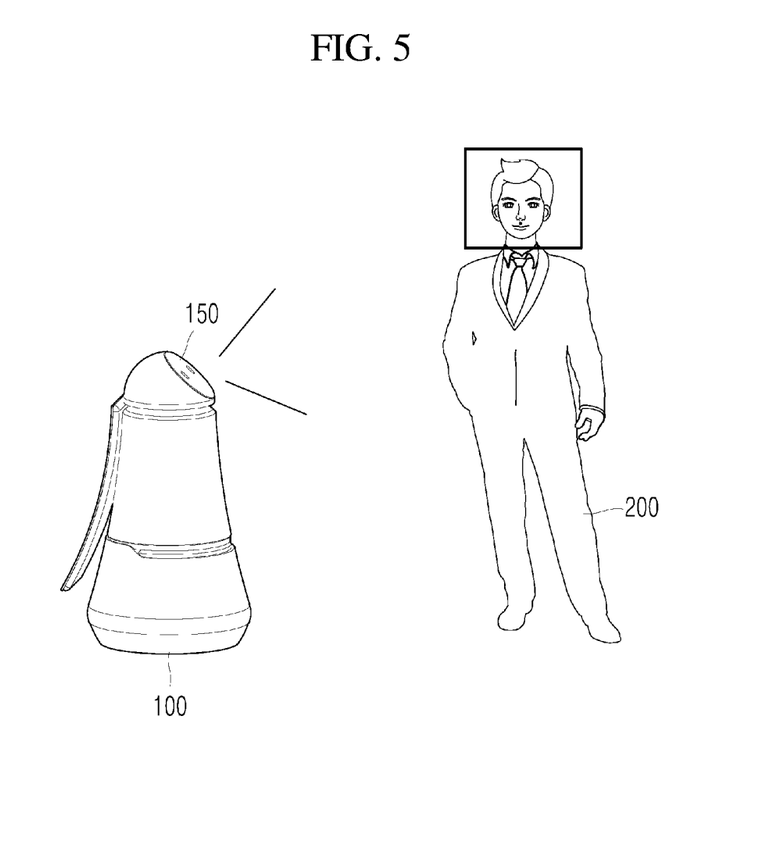
FIG. 5 is a diagram illustrating an example of facial recognition of a facility user by a facility guide robot according to an embodiment of the present disclosure.
Figure 6:
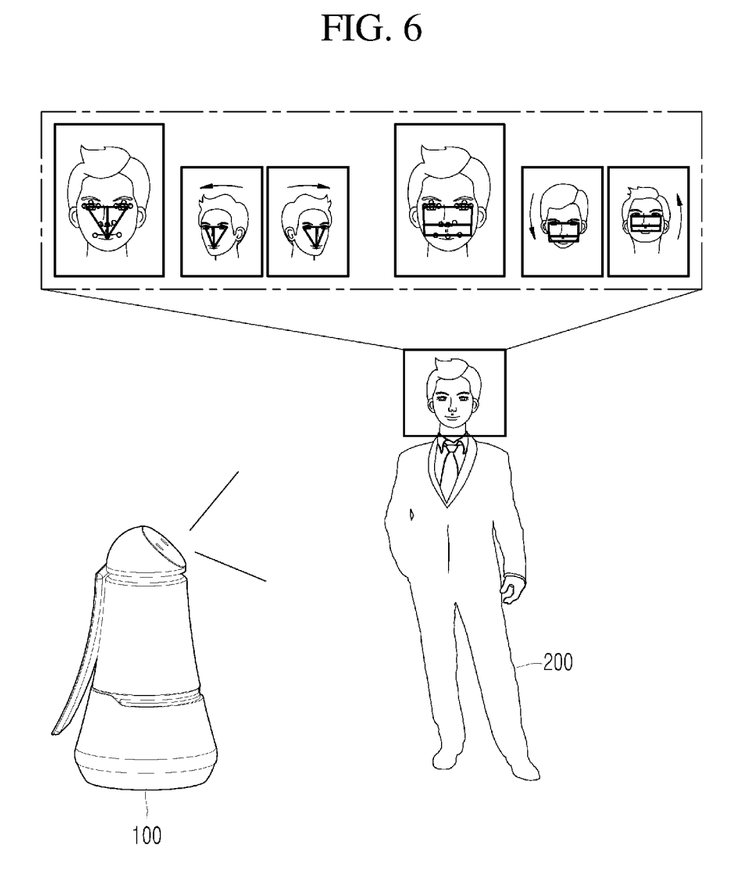
FIG. 6 is a diagram illustrating a specific example of facial recognition of a facility user by the facility guide robot of FIG. 5.

FIG. 5 is a diagram illustrating an example in which the facility guide robot according to an embodiment of the present disclosure recognizes the face of the first user. FIG. 6 is a diagram illustrating an example in which the facility guide robot of FIG. 5 recognizes the face of a first user. In the following description, the description of parts that are the same as those in FIG. 1 to FIG. 4 will be omitted.

Referring to FIGS. 5 and 6, when the first user 200 visits the facility, the facility guide robot 100 may acquire face information of the first user 200 using the mounted camera 115. The recognized face information of the first user 200 may be received by the face information receiver 164. The received face information of the first user 200 may match information of the facility user included in the facility use information.

Specifically, referring to FIG. 6, the action of the first user 200 targeted by the targeter 170 is collected as image and video information by the camera 115. For example, the camera 115 may capture action of the targeted first user 200 as a video and extract an image from the captured video.

The face feature of the targeted first user 200 may be extracted from the extracted image. For example, the number of movements of the pupil of the first user 200, the direction of movement of the pupil of the first user 200, the number of head up, down, left and right movements of the first user 200, and the like may be extracted. It is possible to determine whether the first user 200 is looking for a specific location based on the extracted face features. Specifically, when the number of movements of the pupil of the first user 200 occurs more than three or four times in continuous images, or when the number of movements of the head of the first user 200 occurs more than three or four times in the continuous images, it may be determined that the first user 200 is looking for a specific location.

In this case, the facility guide robot 100 may determine that the first user 200 needs the guide information. The facility guide robot 100 may move adjacent to the first user 200, and then ask the first user 200 a question such as "What can I do for you?" or "Is this your first visit?".

In addition, when the first user 200 is issued a ticket at the airport, information on the ticket, information of the first user 200 inputted when the ticket is issued and face information of the first user 200 extracted by the camera 115 of the facility guide robot 100 may be matched. When the first user 200 moves to a location different from the departure gate stored in the ticket information of the first user 200, the facility guide robot 100 may move to the first user 200, and inform the first user 200 that the first user 200 is moving to an incorrect location.

That is, the facility guide robot 100 may provide guidance on the direction in which the first user 200 should move in consideration of the boarding time, previous facility use history, and the like stored in the memory 120.

Figure 7:
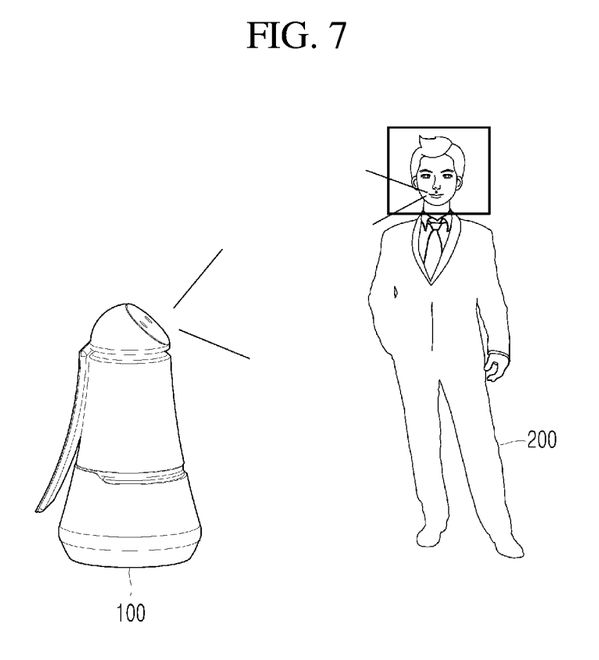
FIG. 7 is a diagram illustrating an example of speech recognition of a facility user by a facility guide robot according to an embodiment of the present disclosure.

FIG. 7 is a diagram illustrating an example of speech recognition of a first user by a facility guide robot according to an embodiment of the present disclosure. In the following description, the description of parts that are the same as those in FIG. 1 to FIG. 6 will be omitted.

Referring to the drawings, the voice receiver 166 of the facility guide robot 100 may receive a speech of the targeted first user 200. That is, while moving inside the facility, the facility guide robot 100 may receive a question asking "Where is the 36 gate?" from the targeted first user 200.

In this case, the facility guide robot 100 may provide the voice information "Gate 36 is 00 direction" to the first user 200 based on the guide information stored in the memory 120 or output the position where the first user 120 should move via the audio outputter 144 or the display 142 of the outputter 140 in the facility guide robot 100 in response to the voice question "where".

Figure 8:
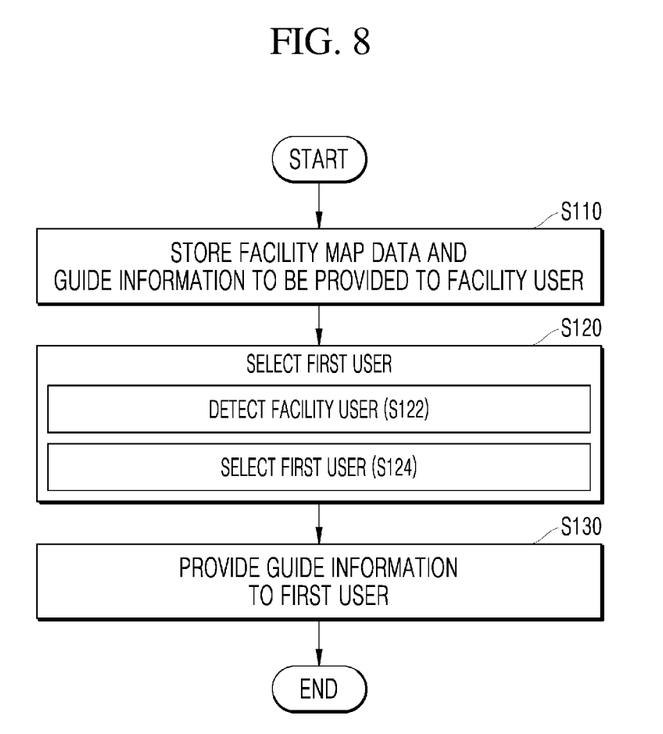
FIG. 8 is a flowchart illustrating a facility guide method using a facility guide robot according to an embodiment of the present disclosure.

FIG. 8 is a flowchart illustrating a facility guide method using a facility guide robot according to an embodiment of the present disclosure. In the following description, the description of parts that are the same as those in FIG. 1 to FIG. 7 will be omitted.

The facility guide robot 100 according to the present disclosure refers to a device capable of providing the facility guide information to the first user 200 who preferentially needs the facility guide information in a large facility such as an airport.

In order to provide the facility guide information to the first user 200 who preferentially needs the facility guide information in the facility, the facility map data and the guide information to be provided to the first user 200 are stored first (step S110).

The guide information may include location guide information such as gate location information, location information on a specific store and location information on a security checkpoint, dangerous factor information in a facility, and the like. Although the guide information may be predetermined based on the information in the map data field, the guide information may be changed depending on the change of the user 200 who uses the facility. That is, when the first user 200 uses the facility, the guide information is stored by storing and learning a trained machine learning model using a data set labeled with the age group of the first user 200, the number of facility use by the first user 200, and the like.

Subsequently, the first user 200 may be selected from among the facility users who visit the facility (step S120). The first user 200 refers to a facility user selected to be actively provided with the guide information from among the facility users who have visited the facility before the selected user requests the guide information.

Specifically, referring to a process of selecting and targeting the first user 200 and providing guide information to the targeted first user 200, information of the first user 200 for using the facility is obtained (step S120). Specifically, the facility user who visits the facility may be targeted as the first user 200 determined to need guidance, based on the facility use history and the biometric information of the facility user, such as face information and age group (step S122, S124).

Here, the first user 200 is targeted among the facility users who use the facility, based on information such as the number of visits to the facility, the use history of the facility such as the space and the shop in the facility, the biometric information user, such as face information, of the facility user, and the like.

When the first user 200 is targeted as described above, the guide information may be provided to the targeted first user 200 before the targeted first user 200 requests the guide information (step S130).

That is, the facility guide robot 100 moves first to the first user 200 before the first user 200 selected by the targeter 170 requests for guide information for using the facility, and asks the first user 200 a question such as "What can I do for you?" or "Is this your first visit?". As such, the facility guide robot 100 actively moves to the first user 200 to provide the guide information, such that the first user 200 may use the facility more conveniently.

The example embodiments described above may be implemented through computer programs executable through various components on a computer, and such computer programs may be recorded in computer-readable media. Examples of the computer-readable medium may include magnetic media such as a hard disk drives (HDD), floppy disks and a magnetic tapes, optical media such as CD-ROMs and DVDs, magneto-optical media such as floptical disks, or hardware devices such as ROMs, RAMs, and flash memories specifically configured to store and execute program commands.

Meanwhile, the computer programs may be those specially designed and constructed for the purposes of the present disclosure or they may be of the kind well known and available to those skilled in the computer software arts. Examples of the computer program may include not only machine language codes generated by compilers but also high-level language codes that may be executed by computers using interpreters.

As used in the present application (especially in the appended claims), the terms "a/an" and "the" include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

The order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. Further, the steps included in the methods according to the present disclosure may be performed through the processor or modules for performing the functions of the step. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. In addition, technical ideas of the present disclosure can also be readily implemented by those skilled in the art according to various conditions and factors within the scope of the appended claims to which various modifications, combinations, and changes are added, or equivalents thereof.

Accordingly, it should be apparent to those skilled in the art that various substitutions, changes, and modifications which are not exemplified herein but are still within the spirit and scope of the present disclosure may be made.

What is claimed is:

1. A facility guide robot, comprising:
a robot body;
a driver configured to move the robot body;
a camera mounted to the robot body and configured to capture an image or a video of users in a facility;
a memory configured to store guide information on the facility; and
a processor configured to:
determine facility users who have visited the facility based on a history of visits to the facility based on facility use information and biometric information of the facility users received via a network,
determine, without an explicit request by a first user for the guide information on the facility, whether to provide the guide information on the facility to the first user among the facility users who have visited the facility based on a number of pupil movements of the first user or a number of head movements of the first user extracted from the captured image or the captured video,
control the driver to move to a location adjacent to the first user, and
cause an output of the guide information in a form of at least one of a voice or an image based on the determine to provide the guide information to the first user,
wherein the facility use information is generated when the first user uses the facility, wherein the facility use information includes at least one of a number of visits to the facility by the first user or historical information of visiting a space in the facility by the first user.

2. The facility guide robot according to claim 1, wherein the processor is further configured to determine whether to provide the guide information on the facility based on an age of the first user, wherein the age of the first user is received from a server.

3. The facility guide robot according to claim 1, wherein the processor is further configured to determine whether to provide the guide information on the facility based on the number of the pupil movements of the first user or the number of the head movements of the first user occurring more than a predetermined number of times according to the captured image or the captured video.

4. The facility guide robot according to claim 1, wherein the guide information includes at least one of guidance on a gate location for checking entry and exit of the first user, guidance on an available space in the facility, guidance on dangerous factors in the facility, or guidance on dangerous situations encountered by the first user.

5. A facility guide method of a robot for guiding a facility user, comprising:
capturing, using a camera mounted to a body of the robot, an image or a video of users in a facility;
determining facility users who have visited the facility based on a history of visits to the facility based on facility use information and biometric information of the facility users received via a network;
determining whether to provide a guide information on the facility to a first user among the facility users who have visited the facility based on at least one of a number of pupil movements of the first user or a number of head movements of the first user extracted from the captured image or the captured video without an explicit request by the first user for the guide information on the facility;
moving the body of the robot to a location adjacent to the first user; and
providing the guide information in a form of at least one of a voice from a speaker or an image on a display based on the determining to provide the guide information to the first user,
wherein the facility use information is generated when the first user uses the facility, wherein the facility use information includes at least one of a number of visits to the facility by the first user or historical information of visiting a space in the facility by the first user.

6. The facility guide method of a robot according to claim 5, further comprising:
determining whether to provide the guide information on the facility based on an age of the first user, wherein the age of the first user is received via a server.

7. The facility guide method of a robot according to claim 5, further comprising: determining whether to provide the guide information on the facility based on the number of the pupil movements of the first user or the head movements of the first user occurring more than a predetermined number of times according to the captured image or the captured video.

8. A non-transitory memory storing one or more programs, which, when executed by one or more processors of a robot, cause the robot to perform a facility guide method for guiding a facility user, the one or more processors comprising instructions for:
capturing, using a camera mounted to a body of the robot, an image or a video of users in a facility;
determining facility users who have visited the facility based on a history of visits to the facility based on facility use information and biometric information of the facility users received via a network;
determining whether to provide a guide information on the facility to a first user among the facility users who have visited the facility based on at least one of a number of pupil movements of the first user or a number of head movements of the first user extracted from the captured image or the captured video without an explicit request by the first user for the guide information on the facility;

moving the body of the robot to a location adjacent to the first user; and providing the guide information in a form of at least one of a voice from a speaker or an image on a display based on the determining to provide the guide information to the first user, wherein the facility use information is generated when the first user uses the facility, wherein the facility use information includes at least one of a number of visits to the facility by the first user or historical information of visiting a space in the facility by the first user.

9. The non-transitory memory of claim 8, wherein the one or more processors further comprise instructions for:

determining whether to provide the guide information based on an age of the first user, wherein the age of the first user is received via a server.

10. The non-transitory memory of claim 8, wherein the one or more processors further comprise instructions for:

determining whether to provide the guide information user based on a number of the pupil movements of the first user or the head movements of the first user occurring more than a predetermined number of times according to the captured image or the captured video.

* * * * *